United States Patent [19]

Bertrand et al.

[11] Patent Number: 4,646,866

[45] Date of Patent: Mar. 3, 1987

[54] SURFACE EFFECT TYPE, SIDE KEEL VESSEL FITTED WITH AN IMPROVED FORWARD BUOYANCY CUSHION SEAL APPARATUS

[75] Inventors: Jean-Paul A. Bertrand, Paris; Jean-Pierre R. Guezou, Athis-Mons; Robert J. Balquet, Paris; Sylvain J. A. Marcouyoux, Le Pradet; Francois C. L. Jodelet, Saint Etienne de Crossey, all of France

[73] Assignee: Etat Francais, France

[21] Appl. No.: 795,104

[22] Filed: Nov. 5, 1985

[30] Foreign Application Priority Data

Nov. 12, 1984 [FR] France .................. 84 17168

[51] Int. Cl.⁴ .............................................. B60V 1/04
[52] U.S. Cl. .................................. 180/126; 180/127; 114/67 A
[58] Field of Search .............. 180/127, 126, 128; 114/67 A

[56] References Cited

U.S. PATENT DOCUMENTS

| | | | |
|---|---|---|---|
| 3,536,156 | 10/1970 | Crago | 180/127 |
| 3,621,932 | 11/1971 | Tattersall | 180/127 |
| 4,090,459 | 5/1978 | Chaplin | 180/128 |
| 4,333,413 | 6/1982 | Davis et al. | 180/127 |
| 4,516,651 | 5/1985 | Duchateau | 180/127 |

*Primary Examiner*—John A. Pekar
*Assistant Examiner*—Donn M. McGiehan
*Attorney, Agent, or Firm*—Parkhurst & Oliff

[57] ABSTRACT

This invention concerns a surface effect vessel whose type comprises a buoyed up structure fitted with two side keels (20), an rear seal apparatus rear and a forward seal apparatus (200) both delimiting a central buoyancy cushion (300). According to the invention the forward seal apparatus (200) consists of an upper horizontal extension shell (210) extending between the two side keels (20) which communicates with the central cushion (300) so as to be supplied by it and two rows of lower multilobe skirts (230, 250) connected below the upper shell (210), which converge towards the center of the central cushion (300) from top to bottom, and whose concavity faces the center of the central cushion (300), the multilobe skirts (230, 250) together delimiting the intermediate chambers (254) which communicate with the upper shell (210) via ports provided in its wall.

12 Claims, 9 Drawing Figures

U.S. Patent  Mar. 3, 1987  Sheet 1 of 3  4,646,866
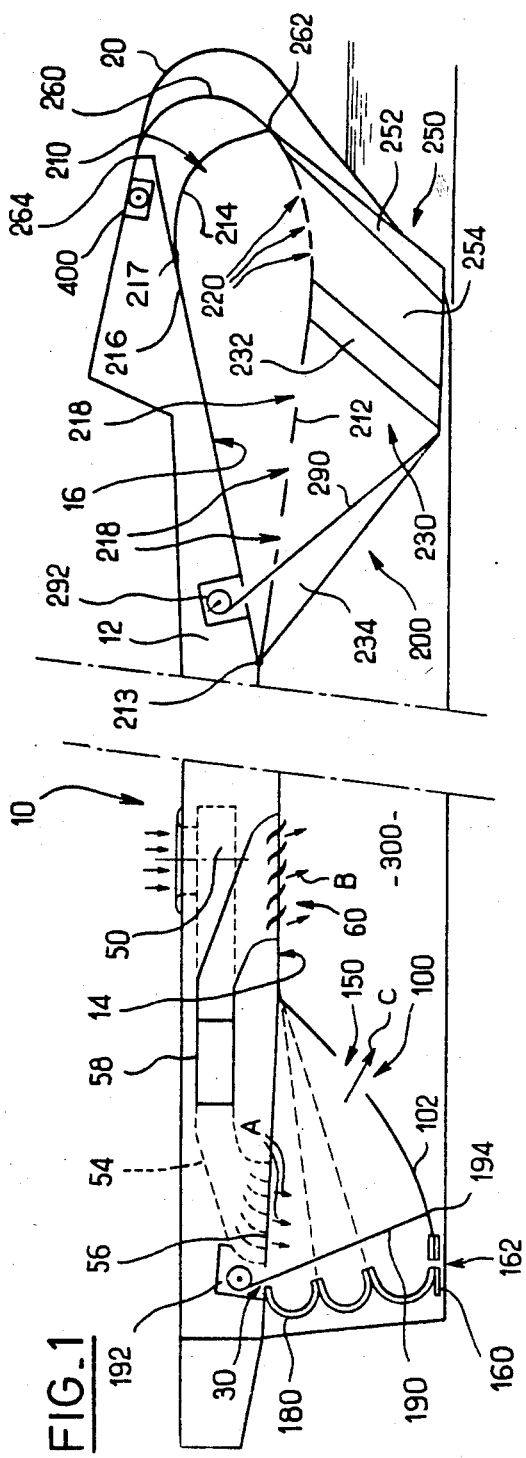
FIG_1
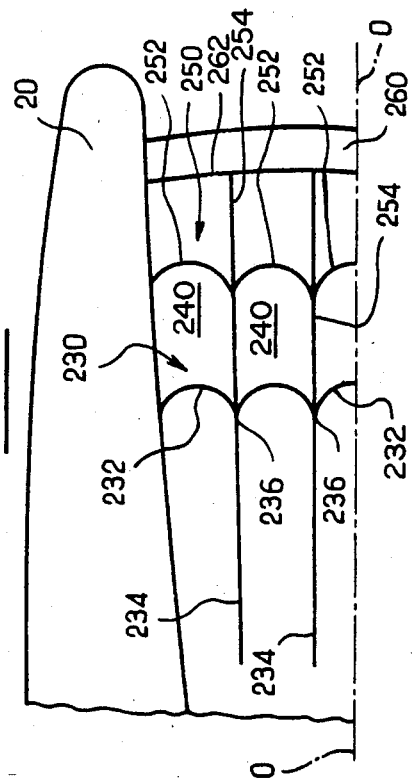
FIG_3
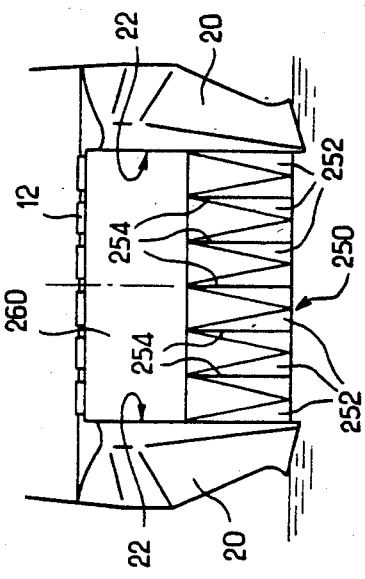
FIG_2

SURFACE EFFECT TYPE, SIDE KEEL VESSEL FITTED WITH AN IMPROVED FORWARD BUOYANCY CUSHION SEAL APPARATUS

BACKGROUND OF THE INVENTION

This invention concerns vessels containing a structure buoyed up by pressurized fluid cushions, so-called surface effect vessels.

This invention concerns more exactly surface effect, side keel vessels, in which the buoyed up structure is provided with a rear seal apparatus and a forward seal apparatus designed to cooperate with the side keels to define a central buoyancy cushion supplied by pressurized air generators, capable of sailing with two modes of navigation, either archimedian navigation on the hull or buoyed up on the cushion.

Attempts have already been made to produce such surface effect, side keel vessels.

U.S. Pat. Nos. 2,977,491, 3,987,865 and 4,090,459, together with the British Pat. Nos. 1 210 973, 1 242 131, or still again the French patent application 2 422 585 illustrate, for example, different theoretical approaches to these systems.

However, in practice, until now the attempts have not proved fully satisfactory insofar as concerns the vessel's pounding in all sea conditions, following of the swell, limitation to leaks and variations in leak rates on the circumference of the cushions, crossing possible obstacles, and consequently performance. Moreover, the previous vessels were only designed for a cushion buoyancy navigation mode, navigation on the hull being only an accessory low speed mode and if necessary used between stoppage and cushion navigation.

The inventors have discovered that the aforesaid problems encountered with the vessels proposed until now were largely due to the methods of supplying the central cushion and the respective forward and aft seal apparatus on these vessels.

Generally speaking, the way proposed until now to define the central buoyancy cushion of surface effect, side keel vessels includes a multilobe skirt generally vertical, opening towards the central cushion, at the forward end and a at the aft end, a horizontal extension shell. This is the case of patent GB 1 242 131.

Most frequently, the shell forming the rear seal is totally separated from the central cushion and connected to the pressurized air generators by associated ducts. The supply of pressurized air to the shell is quite separate from the central cushion, as shown by patent FR 2 422 535.

According to other and less common proposals, such as patent U.S. Pat. No. 3,987,851, the forward seal apparatus and rear seal apparatus—multilobe skirt and horizontal shell are supplied by separate and respectively associated pressurized air generators, whereas the central cushion is supplied indirectly by the forward and aft seal apparatus.

SUMMARY OF THE INVENTION

The present invention proposes a surface effect vessel whose type comprises a buoyed up structure with two side keels, a rear seal apparatus and a forward seal apparatus capable of cooperating with the side keels to define a central buoyancy cushion supplied by a pressurized air generator, in which the front seal, made up at least partially of soft material, includes an upper, horizontal extension shell extending transversally between the two side keels, which communicates with the central cushion so as to be supplied by it, and two rows of lower, multilobe skirts connected below the upper shell, extending transversally between the two side keels, which converge towards the centre of the central cushion, from top to bottom, and whose concavity faces the centre of the cushion, the two rows moreover defining between them intermediate chambers which communicate with the upper shell through ports provided in its wall.

Thus the variable pressure, depending on the position of the seal in relation to the free surface, which prevails in the intermediate chambers, without any external intervention, drives the seal so as firstly to limit the contact between the skirts and the water, which reduces their natural drag under wear, and secondly reduce the variations in the leak rate and hence the variations of pressure in the cushion and moreover improve the comfort of the vessel through gradual pitching compensation, i.e. the gradual creation of a compensation torque opposing the movement of the vessel. All this naturally leads to improving the vessel's pounding comfort.

According to another important feature of the invention, the buoyed up structure contains in the bow a wall inclined upwards away from the centre of the central cushion, and the envelope of the upper shell, convex toward the outside, is connected tangentially to this inclined wall. As will be referred to in more detail hereafter, the stiffness of the forward suspension is due to the inclination of the aforesaid wall to the horizontal and can thus be easily controlled. Thus according to an alternative version, adopted with a view to obtaining a less stiff suspension, the envelope of the upper shell is connected secantly in front of the inclined wall.

According to another feature of the invention, the forward seal also comprises an additional envelope installed on the front of the associated upper shell and connected firstly to the upper end of the most forward row of skirts, secondly to the front of the buoyed up structure.

According to another advantageous feature of the invention, the ports provided in the upper shell of the forward seal to supply the latter from the central cushion and supply the intermediate chambers from the upper shell, are adapted to provide statically a pressure in the shell of the same order of magnitude as the pressure in the central cushion and a pressure in the intermediate chambers between 0.3 and 0.85 times the pressure in the central cushion, so as to provide a sufficient variation margin in the intermediate chambers to guarantee the seals self-regulating function or in other words provide the vertical driving of the seal.

This invention also aims at the navigation of a surface effect, side keel vessel along two modes of operating, either archimedian navigation on the hull or buoyancy on the cushions, in such a way that the vessel can be used at high speed, while navigating on both the hull and on the cushion.

So that the vessel can navigate on the hull in accordance with this invention, lifting facilities are preferably provided on the forward and rear seals.

It is advantageous if these lifting facilities can be formed of cables secured firstly to the lower part of the seals and secondly to associated winches.

Moreover, owing to the fact that a vertical movement of the seal is required in relation to the side keels when navigating on the cushion, without over-jeopardizing the side watertight qualities, anti-friction elements are fitted to the side ends of the seals, slipping on the side wall of the respectively associated keels.

Moreover, the watertightness of the buoyed up structure is completed by discharge of the upper shell into the additional shell, in an alternative version, this discharge can be adjusted by watertight elements forming drip-flap which are fitted to the side ends of the upper and additional shells.

Other features and advantages of this invention will appear on reading the following detailed description and inspecting the appended drawings provided as non-exhaustive examples in which:

BRIEF DESCRIPTION OF THE DRAWINGS

FIG. 1 shows a schematical view with partial vertical longitudinal cross-sections of a surface effect, side keel vessel, according to the present invention, FIG. 2 shows a transversal front view of the same vessel, FIG. 3 shows a partial schematical view from underneath, of the forward portion of a surface effect, side keel vessel according to the present invention.

DETAILED DESCRIPTION OF THE DRAWINGS

Figure 4:
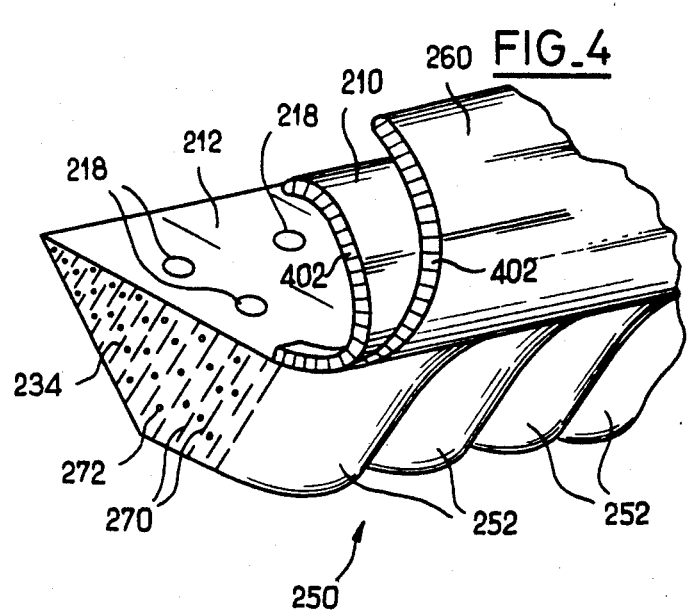
FIG. 4 illustrates a schematical perspective view of a forward seal in accordance with the present invention.

A surface effect vessel 10 has been shown in the figures, especially in FIGS. 1 to 3, according to the present invention and comprising a buoyed up structure 12 with two side keels 20 and moreover containing a rear seal apparatus 100 and a forward seal apparatus 200 capable of cooperating with the side keels 20 to define a central buoyancy cushion 300 supplied by a pressurized air generator, or fan, 50.

The geometry of the buoyed up structure 12 shown in the figures should naturally in no way be considered as exhaustive. The same applies to the geometry of the side keels 20.

Nevertheless, it will be observed, as shown in FIG. 1, that the lower side 14 of the buoyed up structure 12 basically generally horizontal, with the exception of one portion, the furthest forward, itemized 16 on FIG. 1, which is inclined upwards away from the centre of the central cushion 300.

Moreover, according to the method of construction shown on the figures especially in FIG. 2, the side internal surfaces 22 of the keels 20 generally extend vertically, perpendicular to the seals.

We shall now describe the structure of the forward seal 200 shown in the figures.

This forward seal 200 basically consists of an upper, horizontal extension shell 210 and two rows of multilobe skirts, supported on its lower part, itemized respectively 230 and 250 generally speaking.

The upper shell 210, according to the method of construction shown on the figures, consists firstly of a lower wall 212, which is connected behind the lower surface 16 of the buoyed up structure 12, at 213, and secondly of foward wall 214, which is convex to the outside and generally inclined upwards, attached to the lower surface 16 of the buoyed up structure 12 in 216.

The aforementioned wall 214 can for example be partially cylindrical.

Figure 5:
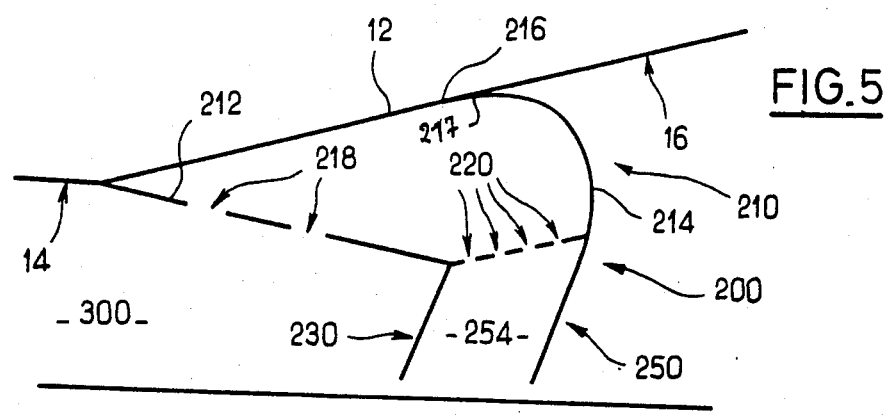
FIG. 5 illustrates an initial alternative version of a forward seal according to the present invention along a longitudinal vertical cross-sectional plane.
Figure 6:
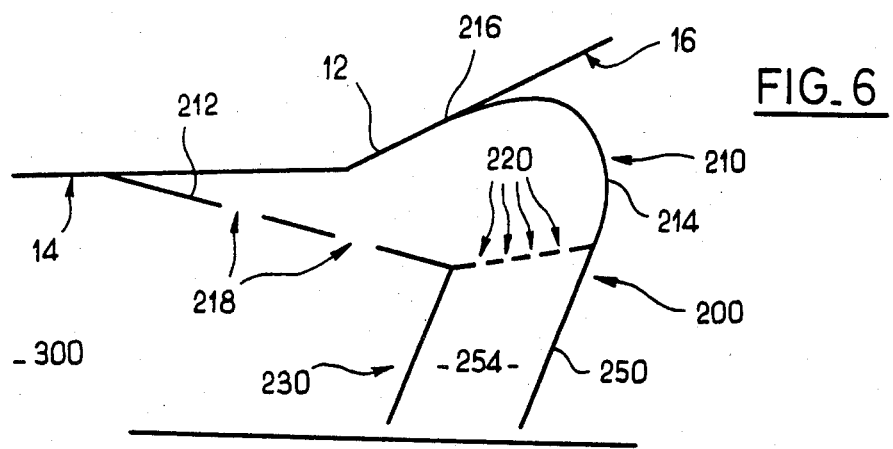
FIG. 6 illustrates schematically a second alternative version of a forward seal according to the present invention along a similar longitudinal vertical cross-sectional plane.

As shown in FIGS. 5 and 6, the upper edge of the forward wall 214 which faces aft, is connected tangentially to the inclined surface 16 of the buoyed up structure 12 at a connection point 217, separate from fastening point 216.

Naturally, to ensure the forward sealing of central cushion 300, the aforesaid upper shell 210 extends transversally to the vessel, the length of the said shell 210, considered transversally to the longitudinal axis O—O is practically equal to the length between the two side keels 20.

The same applies to the two aforesaid rows of skirts 230 and 250.

Skirt 230 which is further aft than skirt 250, is formed of a number of generally cylindrical lobe 232, whose axes converge towards the centre of the cushion, from top to bottom, as shown in the figures, the concavity of the lobes 232 is opened towards the central cushion 300, i.e. towards the aft of the vessel, which furthermore avoids baling.

More precisely, the lobes 232 are defined by hemi-cylindrical envelopes which are extended backward by supporting walls 234 which are parallel to the longitudinal axis O—O of the vessel. More precisely, according to the method of construction shown, the walls 234 are connected by their upper edge to wall 212 of upper shell 210.

The most forward skirt 250 is formed of a number of lobes 252 which is equal to the number of lobes in skirt 230.

These lobes 252 are fitted respectively opposite the aforesaid lobes 232, and in the front of them.

Here again, the lobes 252 are generally semi-cylindrical and converge towards the centre of the central cushion 300 from top to bottom. The concavity of the lobes 252 is open towards central cushion 200, i.e. towards the stern of the vessel, which prevents baling.

The aforesaid lobes 252 are, practically semi-cylindrical and, extend backward via flat walls 254 which are, parallel to the longitudinal axis O—O of the vessel, and connected firstly by their upper edge to wall 212 of the upper shell 210, and secondly through their after free edge inclined to the vertical, at the level of the adjacent line 236 of aft lobes 232, as shown in particular in FIG. 3.

Nevertheless it will be observed that according to the method of construction shown in the figures, lobes 252 are connected at the upper end to shell 210 via a practically straight and horizontal linkage.

In this way, as shown in the front view of FIG. 2, the envelope of lobes 252 appears in the form of a combination firstly of a generally upper plane triangle whose base defines the coupling with the upper shell 210 and the point is directed downwards, and secondly by two conical sectors connected on either side of the aforesaid triangle.

The two skirts 230 and 250 previously referred to define between them a series of intermediate chambers itemized 240.

These chambers 240 communicate with the upper shell 210 via ports 220. Moreover, the latter communicate with the central cushion 300 by ports 218 provided in wall 212 of shell 210.

According to an important feature of this invention, the ports 218 providing communication between the upper shell 210 and central cushion 300 are defined in such a way that the pressure prevailing in the upper shell 210 is practically equal to the pressure in the central cushion 300, when static.

Moreover, the ports 220 providing a communication between the upper shell 210 and intermediate chambers 240 are sized to provide a pressure drop such that the pressure when static, inside the intermediate chambers 240 is between 0.3 and 0.5 times the pressure of the central cushion 300. The intermediate chambers 240, thus form a transition area between the pressure of central cushion 300 and the atmospheric pressure outside. Among other things, this device reduces the cushion's wave resistance.

Furthermore, the inventors have observed that the preferential relative pressure values referred to above provide for constantly satisfactory inflation of skirts 230 and 250, regardless of navigation conditions.

As illustrated in FIG. 5 respect to 7, the inclination to the horizon (i.e. horizontal inclination) of the forward inclined surface 16 of buoyed up structure 12, to which the upper end of wall 214 is connected, can take on various values according to the present application.

The choice of the inclination depends upon the suspension stiffness required, since the stiffness of the suspension is directly related to the inclination of the surface 16 to the horizontal.

The professional will in fact easily understand that, when surface 16 has a shallow horizontal inclination as shown on FIG. 5, the contact between the forward wall 214 and the inclined wall 16 greatly limits the upward movements of the forward seal in those situations where the free surface of the seal rises relative to the vessel. The stiffness of the suspension is therefore considerable.

As shown in FIG. 6, the horizontal inclination of surface 16 of the buoyed up structure 12 is medium. Here, the upward movement of the front seal is less limited. Thus the suspension is more flexible.

Figure 7:
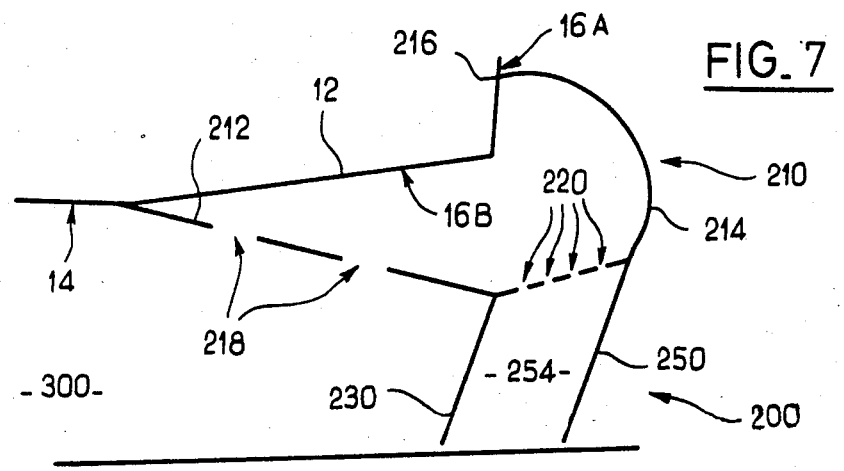
FIG. 7 illustrates a third alternative version of a forward seal according to the present invention along a similar longitudinal vertical cross-sectional plane.

Finally, in an extreme case, as shown in FIG. 7, the surface 16 is divided into a first section 16B having a slight horizontal inclination and a second forward section 16A which is practically vertical, to which the aforesaid wall 214 of upper shell 210 is connected, a strong movement upwards of this latter and the whole of the forward seal is authorized in case of a relative elevation of the free surface. The suspension is then at maximum flexibility. Moreover, according to a version not shown here, a stiffness variable depending on the vertical position of the seal can be obtained by producing either a concavity or appropriate stepping of surface 16.

As shown in FIG. 1, if required, a small envelope 260 can be fitted on the front of the upper shell 210, connected firstly at 262 to the upper end of the forward row of skirts 250 and secondly at 264 to the forward transom of the buoyed up structure 12.

Preferably, this additional envelope 260 convex to the outside, is formed of a cylindrical revolution envelope with horizontal generatrix.

The additional envelope 260 communicates with the upper shell 210 via ports made in shell 214 and not shown in the figures to simplify the illustration.

Moreover, so as to operate the ship, either by buoyancy on a pressurized fluid cushion, or navigating on the hull, lifting facilities are preferably provided for the to forward seal 200.

According to the method of construction shown in FIG. 1, these lifting facilities generally consist of cables or straps 290 secured firstly to the lower part of the forward seal, for example on the row of skirts 230 furthest inside, and associated secondly to a winch 292 carried by the buoyed up structure 12. Moreover, according to an alternative version shown in FIG. 1, the front of envelope 260 can be lifted by winch 400.

Figure 8:
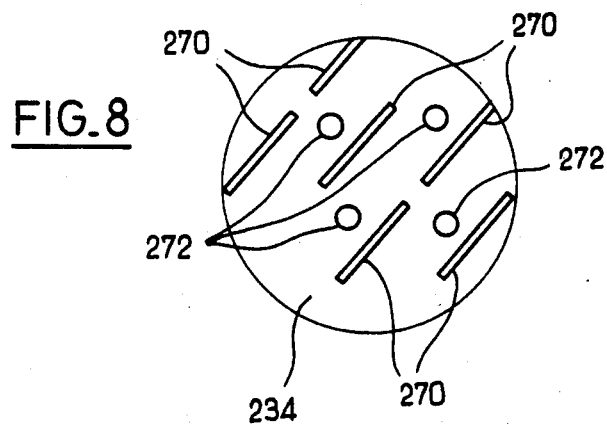
FIG. 8 shows an enlarged side view of the anti-friction elements illustrated on FIG. 4.
Figure 9:
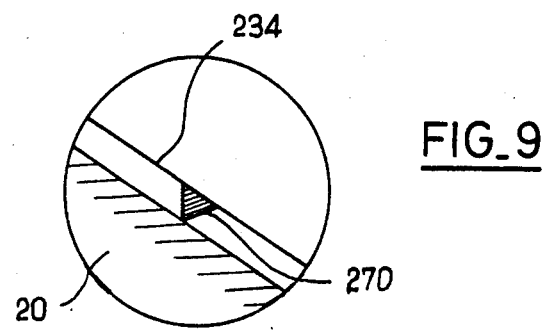
FIG. 9 shows a view of the same side anti-friction elements along a section generally orthogonal to the axis of the lower skirts.

Moreover, anti-friction elements fitted on the side ends of the front seal as shown in FIGS. 4, 8 and 9, allow the front seal to slip on the side wall of the respectively associated keels. The elements comprise a number of rows of anti-friction beads 270, straight and intermittent offset longitudinally from one row to another. These anti-friction beads 270 are more precisely fitted to the outer surface of the side wall 234; preferably the anti-friction beads 260 are horizontally inclined similarly to the generatrixes of lobes 232.

Moreover, air lube holes 272 are provided in the side walls 234 so as to limit the friction between the anti-friction beads 270 and the side walls of keels 20.

As shown in FIG. 9, the straight section of the anti-friction beads 270, considered perpendicularly to their general extension, is preferably practically triangular, the point of this section lying against the side surfaces of keels 20.

Preferably, water elements forming drip-flaps 402 are fitted to the side ends of the upper vessel 210 and additional envelope 260 as shown on FIG. 4.

Naturally, this invention is in no way limited to the methods of construction just described, but extend to all versions complying with its ideas.

For example, the internal side surfaces of keels 20 need not be vertical.

In this case, the geometry of the multilobe skirts 230 and 250 is adapted according to the shape of the keel 20. For example, the side lobes of the skirts can be of a generally truncated cone form to provide a narrow contact between the forward seal of side keels so as to limit leaks as far as possible. Similarly, the geometry of the upper shell 210 is adapted to that of the side keels 20.

Preferably the seals are produced in neoprene coated soft fabrics.

The rear seal 100 basically consists of a horizontal extension shell, extending transversally to the vessel between the two keels 20. This shell is partially defined, as shown for example in FIG. 1, by an internal wall 102 (convex to the cushion in use) inclined upwards closing in on the centre of the central cushion 300.

The internal volume of the chamber formed by rear seal 100 is connected to the aforesaid pressurized air generator 50 via pipes 54, which emerge in a port 56 provided in the lower wall of the buoyed up structure 12 above chamber 100, as shown in FIG. 1.

Communicating ports 150 are also provided in the front of rear seal chamber 100 so that central cushion 300 is supplied with pressurized air partially via the rear seal chamber 100.

In the figures, the supply of the rear seal chamber 100 by the first systems forming pipes 54 is illustrated by arrows item A.

As shown in the figures, the central cushion 300 defined by the side keels 20, forward seal 200 and rear seal 100 is also coupled directly to the pressurized air generator via a pipe labeled 58 in the figures which emerge in the central cushion in ports 60 provided in the lower wall of the buoyed up structure 12.

Thus, the central cushion 300 is partly supplied directly by fan 50 (via pipe 58), and partly supplied indirectly, via rear seal chamber 100.

In the figures, these direct and indirect supplies of the cushion are illustrated respectively by the arrows labeled B and C.

To allow operation of the vessel either in the form of a surface effect vessel buoyed up by a pressurized fluid cushion, or navigating on the hull, means have been provided to lift the rear seal 100.

According to the method of construction shown in FIG. 1, these lifting facilities consist of cables or straps 190 associated with the winch 192, installed in the buoyed up structure 12.

More precisely, the cables 190 which extend generally vertically inside the rear seal are connected vertically at the lower end, to the low point of shell 100, 194, and secondly to winch 192, for this purpose passing through a bore-hole 30 provided in the lower wall of the buoyed up structure 12.

Nevertheless, to limit the leaks between the side keels 20 of the vessel and the side ends of the rear seals 100, it is preferable to install flexible elements 180 forming drip-flap on the side ends of shell 100. These drip-flaps are designed to slip on the side wall of the keel associated with them.

Panels which are generally horizontal 160 can also be seen in FIG. 1. The panels are installed on the lower part of shell 100 so as to be brought into contact with the water.

These panels 160 fulfill a triple function.

Firstly, they fulfill a hover function. The force applied to these panels during contact with the free surface of the rear seal tends to make the rear seal retract.

Moreover, these panels 160 strengthen the lower part of shell 100 and limit the wear of it.

Finally, these panels 160 channel the leak flow so as to reduce the drag.

Also the presence of drain holes 162 will be observed in the lower part of the after seal. These holes 162 can be provided for example in a lower area common to wall 102 and to panels 160.

We claim:

1. A forward seal apparatus for use in a surface effect vessel of the type comprising a buoyed up structure fitted with two side keels, a rear seal apparatus, a forward seal apparatus and a central buoyancy cushion supplied with pressurized air by a pressurized air generator and defined by the two side keels, the front seal apparatus and the rear seal apparatus;

said forward seal apparatus comprising an upper horizontal extension shell adjoining said buoyed up structure and a lower shell, wherein;

said upper horizontal extension shell is defined by a lower wall and a forward wall said lower wall and said forward wall being attached together, and each of said lower wall and said forward wall being connected to the buoyed up structure;

said lower shell is defined by two rows of multilobe skirts connected below the upper shell, defining between them intermediate chambers; and said upper horizontal extension shell is supplied with pressurized air via said central buoyancy cushion and said lower shell is supplied with pressurized air via said upper shell, so as to provide a vertical lifting force on said forward seal.

2. A surface effect vessel of the type comprising a buoyed up structure fitted with two side keels, a rear seal apparatus, and a forward seal apparatus wherein:

said rear seal apparatus and said forward seal apparatus cooperate with the side keels to define a central buoyancy cushion supplied by a pressurized air generator; and the forward seal contains an upper horizontal extension shell extending between the two side keels, said upper horizontal extension shell communicating with the central cushion via ports to receive pressurized air therefrom; and first and second rows of lower multilobe skirts are connected below the upper horizontal extension shell, said first and second lower multilobe skirts converging toward the center of the central cushion from top to bottom; and the first and second multilobe skirts define between them intermediate chambers which communicate with the upper horizontal extension shell via ports provided in a wall of the upper horizontal extension shell.

3. Surface effect vessel according to claim 1, wherein a front portion of the buoyed up structure includes a wall which is inclined upwardly and away from the center of the central cushion; a portion of the upper horizontal extension shell being connected tangentially to the inclined wall at a distinct fastening point.

4. Surface effect vessel according to claim 1, wherein a front portion of the buoyed up structure includes a wall which is inclined upwardly and away from the center of the central cushion; and wherein a portion of the upper horizontal extension shell is connected secantly to the buoyed up structure in front of the inclined wall.

5. Surface effect vessel according to claim 1, wherein the forward seal includes an additional portion which is installed in front of the upper horizontal extension shell, said additional portion being connected firstly to an upper end of the first row of multilobe skirts, and secondly to the front of the buoyed up structure, said additional portion being supplied with pressurized air at a reduced pressure from the upper horizontal extension shell.

6. Surface effect vessel according to claim 1, wherein the ports provided in the upper horizontal extension shell of the forward seal to supply pressurized air to the upper horizontal extension shell from the central cushion and the ports which supply pressurized air to the intermediate chambers from the upper horizontal extension shell are adapted to provide, when static, a pressure in the upper horizontal extension shell which is substantially equal to the pressure in the central cushion, and a pressure in the intermediate chambers which is between 0.3 and 0.75 times the pressure in the central cushion.

7. Surface effect vessel according to claim 5, wherein means are provided for lifting the forward seal to facilitate navigation on the hull.

8. Surface effect vessel according to claim 7, wherein the means for lifting the forward seal includes cables fastened to a lower part of the forward seal and winches carried by the buoyed up structure.

9. Surface effect vessel according to claim 7, wherein the means for lifting the forward seal includes winding winches for the additional portion.

10. Surface effect vessel according to claim 7, wherein anti-friction elements are fitted on side ends of the first and second rows of multilobe skirts of the forward seal.

11. Surface effect vessel according to claim 10, wherein the anti-friction elements consist of a number of rows of straight and intermittent anti-friction beads, and wherein lube holes are provided in a side wall of the multilobe skirts.

12. Surface effect vessel according to claim 1, wherein watertightness of the buoyed up structure is completed by the discharge of the upper horizontal extension shell into the additional portion, and wherein the discharge can be adjusted by watertight elements forming drip-flaps fitted to the side ends of the upper horizontal extension shell and the additional portion.

* * * * *